United States Patent [19]

Davis

[11] 4,450,214

[45] May 22, 1984

[54] LITHIUM HALIDE ADDITIVES FOR NONAQUEOUS CELL SYSTEMS

[75] Inventor: Stephen G. Davis, Rocky River, Ohio

[73] Assignee: Union Carbide Corporation, Danbury, Conn.

[21] Appl. No.: 388,478

[22] Filed: Jun. 14, 1982

[51] Int. Cl.³ .............................................. H01M 6/14
[52] U.S. Cl. .................................... 429/194; 429/199
[58] Field of Search ........................ 429/194, 197, 199

[56] References Cited

U.S. PATENT DOCUMENTS

| | | | |
|---|---|---|---|
| 3,726,716 | 4/1973 | Athearn et al. | 136/100 R |
| 4,084,045 | 4/1978 | Kegelman | 429/104 |
| 4,163,829 | 8/1979 | Kronenberg | 429/194 |
| 4,166,888 | 9/1979 | Rao | 429/194 |
| 4,184,017 | 1/1980 | Kelsey et al. | 429/197 |
| 4,228,227 | 10/1980 | Saathoff et al. | 429/194 |
| 4,258,109 | 3/1981 | Liang et al. | 429/191 |
| 4,279,972 | 7/1981 | Moses | 429/194 X |
| 4,315,976 | 2/1982 | Conte | 429/194 |
| 4,318,969 | 3/1982 | Peled et al. | 429/194 X |
| 4,328,288 | 5/1982 | Taylor | 429/194 X |
| 4,332,869 | 6/1982 | Margalit | 429/194 |
| 4,336,315 | 6/1982 | Eda et al. | 429/194 |

FOREIGN PATENT DOCUMENTS

| | | |
|---|---|---|
| 49-33127 | 3/1974 | Japan . |
| 49-7846250 | 4/1974 | Japan . |
| 49-7935289 | 4/1974 | Japan . |
| 49-50-136625 | 10/1975 | Japan . |
| 54-157225 | 12/1979 | Japan . |
| 55-109002 | 8/1980 | Japan . |

*Primary Examiner*—Charles F. LeFevour
*Attorney, Agent, or Firm*—Cornelius F. O'Brien

[57] ABSTRACT

A lithium nonaqueous cell employing a $FeS_2$-containing or $MnO_2$-containing cathode and an organic electrolyte and wherein a lithium halide, such as LiCl, is added to the cell to improve the voltage level on pulse discharge of the cell particularly at low temperatures and/or to stabilize the open circuit voltage.

14 Claims, No Drawings

LITHIUM HALIDE ADDITIVES FOR NONAQUEOUS CELL SYSTEMS

FIELD OF THE INVENTION

The invention relates to the addition of a lithium halide to a nonaqueous cell employing a lithium anode, a liquid organic electroylte, and an active cathode such as $FeS_2$ or $MnO_2$ for the purpose of improving the voltage level on pulse discharge of the cell.

BACKGROUND OF THE INVENTION

The battery has become a primary power source for many portable electronic devices such as radios, hearing aids, watches, calculators, and the like. Many of these electronic devices are designed to operate at a minimum voltage level and therefore require a power source capable of delivering a relatively stable voltage output. Some of the electronic devices, such as watches, are designed to operate from a source of power that can deliver pulse voltage outputs at a stabilized level. It has been observed that nonaqueous lithium cells generally cannot maintain a sufficiently high voltage during the pulsing of the cells thus making them unsuitable in some instances for operating electronic devices such as watches. This problem is believed to be due to the polarization of the lithium anode caused by the presence of a passivating film on the lithium. Thus when the lithium cell is pulsed, the voltage drops until the film is sufficiently disrupted to allow the relatively unimpeded transport of ions to and from the anode. As the current increases due to the increased ion flow, the voltage wil also begin to rise so as to approach a steady state or stabilized level. This delay in achieving a stable voltage on load is most apparent when the cell is pulsed at low temperatures and is also aggravated by open circuit storage at room temperature and above.

Another problem encountered with cells such as nonaqueous lithium cells is that when they are first constructed, the open circuit voltage (OCV) is usually much higher than the equilibrium OCV which is obtained after aging. This is believed due to the self discharge of impurities which are generally associated with the active cathode. For example, in a $Li/FeS_2$ cell, the initial OCV can be over 3 volts whereupon it will decrease to a level of about 1.8 volts after about a year storage at ambient temperature. Since the nominal OCV level for a $Li/FeS_2$ cell is generally about 1.5 volts, it would be beneficial if its OCV could be stabilized to about 1.8 volts more rapidly. One approach to reduce the initial high OCV due to the presence of impurities in the cathode is to add a reducing metal additive, such as zinc, to the cathode as is disclosed in U.S. Pat. No. 4,163,829 to Kronenberg. This additive will effectively reduce the high potential impurities thus enabling the OCV or the cell to reach an equilibrium level more rapidly. This rapid attainment of an equilibrium or stable OCV is important in that it allows the cell to be put into use at an earlier date after the manufacture of the cell.

It is, therefore, an object of this invention to provide a nonaqueous lithium cell that has an improved pulse voltage output particularly at low temperatures.

Another object of the present invention is to provide a nonaqueous lithium cell that can reach an equilibrium OCV level rapidly after being manufactured.

Another object of the present invention is to provide a $Li/FeS_2$ cell that has an improved pulse voltage output particularly at low temperatures and is capable of attaining an equilibrium OCV level rapidly after being manufactured.

Another object of the present invention is to provide a $Li/MnO_2$ cell that has an improved pulse voltage output particularly at low temperatures and is capable of attaining an equilibrium OCV level rapidly after being manufactured.

Another object of the present invention is to provide a nonaqueous lithium cell with the lithium halide additive to improve the voltage level on pulse discharge of the cell particularly on low temperatures and to decrease the time required for the cell to attain its OCV equilibrium level after being manufactured.

The foregoing and additional objects will become more apparent from the following description.

SUMMARY OF THE INVENTION

The invention relates to a nonaqueous cell comprising a lithium anode; an active cathode selected from the group consisting of an iron sulfur-containing cathode and a $MnO_2$-containing cathode; and a liquid organic electrolyte; the improvement wherein a minor amount of at least one lithium halide is added to the cell to improve the voltage level on pulse discharge of the cell particularly at low temperatures.

The lithium halide additive could be dissolved directly in the electrolyte and/or deposited as a thin film on the anode and/or incorporated into the cathode. The preferred method of practicing the invention is to dissolve the lithium halide directly in the electrolyte. The lithium halide additive could be added to the electrolyte in amount between about 0.05 M up to saturation of the additive in the electrolyte at 25° C. for open circuit voltage stabilization. Preferably, the lithium halide additive could be added to the electrolyte in an amount between about 0.075 molar (M) and about 0.2 molar (M) for both open circuit voltage stabilization and pulse discharge improvement. When the lithium halide is deposited as a film on the anode and/or is incorporated into the cathode, then the amount of the lithium halide to be added should be at least an amount that if dissolved directly into the electrolyte would fall within the range recited above. It should be understood that when the lithium halide is added to the cathode, the amount of the lithium halide could be greater than the amount that would be dissolved in the electrolyte. It should be further understood that if the lithium additive is deposited on the anode and/or added to the cathode, then any additional amount of the lithium halide dissolved into the electrolyte could be less than the minimum amount recited above.

Although not wanting to be bound by theory, it is believed from available thermodynamic data that the passivating film formed on the anode is not displaced by a lithium halide film but that the lithium halide inhibits the formation of the passivating film. Thus it would appear that the bulk concentration is less important than the anode surface concentration. Therefore a lesser amount of the lithium halide would be required if it were deposited as a film on the anode. An amount of the lithium halide equal to a bulk electrolyte concentration of about 0.01 M would be suitable in some cell applications. Generally, the quantity of the lithium halide and the method of incorporating it into the cell will depend on its ability to provide a surface concentration on the anode that is equivalent to that provided by an electrolyte concentration of the lithium halide from about 0.05 M, preferably from about 0.075 M, up to its saturation in the electrolyte at 25° C.

Suitable lithium halides for use in this invention are LiCl, LiF, LiBr, LiI and mixtures thereof. The preferred additive is LiCl because it is believed that the presence of the chloride will better inhibit the formation of a passivating film on the anode.

Preferably, the cathodes for use in this invention, such as $FeS_2$ or $MnO_2$, should be mixed with a conductive agent such as graphite, carbon or the like and a binder such as polytetrafluoroethylene, ethylene acrylic acid copolymer or the like to produce a cohesive cathode. If desired, a small amount of the electrolyte could be incorporated into the cathode mix.

Since $FeS_2$/Li cells expand during discharge on low drains (150 K-ohm load for a 120 milliampere-hour capacity), it is within the scope of this invention to mix other solid active cathode materials with $FeS_2$ that will not expand as much as the $FeS_2$ during discharge. Thus suitable combinations would be:

$FeS_2 + CuO$ $FeS_2 + Bi_2O_3$ $FeS_2 + Pb_2Bi_2O_5$ $FeS_2 + Pb_3O_4$ $FeS_2 + CuO + Bi_2O_3$ $FeS_2 + CuO + Pb_3O_4$ $FeS_2 + CuO + CoS_2$ $FeS_2 + CoS_2$ $FeS_2 + CuO + Pb_3O_4$

The negative electrode for use in this invention is lithium, which in addition to being a ductile metal that can be easily assembled in a cell, possesses one of the highest energy-to-weight ratios of suitable negative electrodes for cell applications. The disadvantage of using lithium as an electrode for nonaqueous cells is that on the surface of the lithium a passivating film is formed. However, with the addition of a lithium halide to the cell in accordance with this invention, the passivation of the lithium anode can be decreased thereby improving the voltage level on pulse discharge of the cell.

Preferred solvents for use with nonaqueous cells are sulfolane; crotonitrile; nitrobenzene; tetrahydrofuran; 1,3-dioxolane; 3-methyl-2-oxazolidone; propylene and ethylene carbonate; gamma-butyrolactone; ethylene glycol sulfite; dimethylsulfite; dimethyl sulfoxide; and 1,1-and 1,2-dimethoxyethane. Of the preferred solvents, the best are 3-methyl-2-oxazolidone; propylene and ethylene carbonate, 1,2-dimethoxyethane and 1,3-dioxolane because they appear more chemically inert to battery components and have wide liquid ranges, and especially because they permit highly efficient utilization of the cathode materials.

The ionizing solute for use in the invention may be a simple or double salt or mixtures thereof, e.g., $LiCF_3SO_3$ or $LiClO_4$, which will produce an ionically conductive solution when dissolved in one or more solvents. Useful solutes include complexes of inorganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226-July/December, 1938, pages 293-313 by G. N. Lewis).

A separator for use in this invention has to be chemically inert and insoluble in the cell system and have a porosity so as to permit the liquid electrolyte to permeate through and contact the negative electrode of the cell, thus establishing an ion transfer path between the negative and positive electrodes.

The two-part container housing for the cell could be made of stainless steel, nickel, nickel-plated steel, nickel clad steel or some other conductive material that will not corrode or otherwise deteriorate when in contact with the cell materials.

The insulating member disposed between the cover and the can has to be stable in the presence of the cell components and can be selected from such materials as polytetrafluoroethylene, fluorinated ethylene-propylene polymer, ethylene copolymer with fluorinated ethylene-propylene, polychlorotrifluoroethylene, perfluoro-alkoxy polymer, polyvinyl, polyethylene, polypropylene, polystyrene, nylon, etc.

EXAMPLE 1

Several nonaqueous cells were produced using an anode of 52 milligrams of lithium; a cathode of 270 milligrams of a wet mix containing 82% by weight $FeS_2$, 8% by weight acetylene black, 8% by weight polytetrafluoroethylene emulsion and 2% by weight zinc; and 180 milliliters of an electrolyte comprising about 40 vol. percent dioxolane, abut 30 vol. percent dimethoxyethane (DME), about 30 vol. percent 3Me20x plus about 0.2% dimethylisoxazole (DMI) and containing 0.5 M $LiCF_3SO_3$. Two of the cells, Cell A and Cell B, were used as control cells while two other cells, Cell C and Cell D, had 0.2 moles per liter of LiCl dissolved in the electrolyte. The open circuit voltages (OCV) of the cells were measured and are reported in Table 1. As evident from the data in Table 1, the open circuit voltages of the cells containing LiCl stabilized more rapidly than those of the control cells.

TABLE 1

| Time (days) | Cell A (OCV) | Cell B (OCV) | Cell C (OCV) | Cell D (OCV) |
|---|---|---|---|---|
| 0 | — | — | 2.22 | 2.22 |
| 1 | — | — | 1.79 | 1.79 |
| 2 | 2.21 | 2.28 | 1.77 | 1.77 |
| 3 | 2.0 | 2.08 | 1.75 | 1.75 |
| 4 | 1.94 | 1.98 | 1.74 | 1.74 |
| 5 | 1.89 | 1.93 | 1.73 | 1.73 |
| 6 | 1.87 | 1.89 | 1.73 | 1.73 |
| 7 | 1.85 | 1.86 | 1.73 | 1.73 |
| 8 | — | — | 1.73 | 1.73 |
| 9 | 1.82 | 1.84 | 1.73 | 1.73 |
| 10 | — | — | 1.73 | 1.73 |
| 11 | 1.8 | 1.82 | 1.73 | 1.73 |
| 12 | — | — | 1.73 | 1.73 |
| 13 | — | — | 1.73 | 1.73 |
| 14 | 1.77 | 1.79 | 1.73 | 1.73 |

EXAMPLE 2

Several nonaqueous cells were constructed as in Example 1 except that in two cell lots zinc was not added to the cathode. The open circuit voltage (OCV) of each cell was taken and the average value for three cells in each cell lot is shown in Table 2 along with the minimum and maximum OCV measured for the cells in each lot. After storage at 21° C. for 13 days the cells in each lot were discharged across a 15 K-ohm load for less than 30 minutes and then pulse discharged across a 1 K-ohm load whereupon the closed circuit voltage (CCV) was measured. The average CCV of three cells in each lot was calculated and is shown in Table 2 along with the minimum and maximum CCV measured for the cells in each lot. The data presented in Table 2 clearly show that the cells employing the LiCl additive exhibited a more stabilized voltage than the voltage exhibited for the cells that did not have the LiCl additive.

TABLE 2

| Cell | Additive | | OCV (volts) | | | CCV (volts)*** | | |
|---|---|---|---|---|---|---|---|---|
| Lot | *Zn | **LiCl | Avg. | Min. | Max. | Avg. | Min. | Max. |
| A | yes | no | 1.85 | 1.85 | 1.85 | 1.36 | 1.35 | 1.38 |
| B | yes | yes | 1.75 | 1.75 | 1.75 | 1.38 | 1.38 | 1.38 |
| C | no | no | 2.22 | 2.20 | 2.24 | 1.57 | 1.53 | 1.64 |
| D | no | yes | 1.81 | 1.80 | 1.82 | 1.41 | 1.39 | 1.43 |

*2% zinc added to the cathode
**0.2 moles/liter dissolved in the electrolyte solution
***measured after 2 seconds.

EXAMPLE 3

Several nonaqueous cells were constructed as in Example 2 with and without zinc and with and without LiCl as shown in Table 3.

TABLE 3

| Cell | Additive | |
|---|---|---|
| Lot | *Zinc | *LiCl |
| A | yes | no |
| B | yes | yes |
| C | no | no |
| D | no | yes |

Six cells of each type from cell lots A, B, C and D were tested for open circuit voltage (OCV) over a thirteen-day period after which three cells from each lot were further tested for open circuit voltage for an additional seven-day period. The average OCV for the cells in each lot was calculated and the data obtained are shown in Table 4.

TABLE 4

| Time (days) | Lot A (OCV) | Lot B (OCV) | Lot C (OCV) | Lot D (OCV) |
|---|---|---|---|---|
| 1 | 2.4 | 1.9 | 3.1 | 2.4 |
| 2 | 2.4 | 1.8 | 3.0 | 2.1 |
| 3 | 2.3 | 1.8 | 2.8 | 2.0 |
| 4 | 2.1 | 1.8 | 2.7 | 1.9 |
| 6 | 2.0 | 1.8 | 2.5 | 1.9 |
| 8 | 1.9 | 1.8 | 2.4 | 1.8 |
| 10 | 1.9 | 1.8 | 2.3 | 1.8 |
| 13 | 1.9 | 1.8 | 2.3 | 1.8 |
| 20 | 1.8 | 1.7 | 2.1 | 1.8 |

EXAMPLE 4

Several nonaqueous cells were constructed using an anode of 21.5 milligrams of lithium; a cathode of 124.4 milligrams of a wet mixture containing 82% by weight $FeS_2$, 8% by weight acetylene black, 8% by weight polytetrafluoroethylene emulsion and 2% by weight zinc; and 0.085 milliliters of an electrolyte comprising about 40 vol. percent dioxolane, about 30 vol. percent dimethoxyethane (DME), about 30 vol. percent 3Me2Ox plus about 0.2% dimethylisoxazole (DMI) and containing 1 M $LiCF_3SO_3$. Additional cells were constructed using the same components except that the active cathode material was a mixture of 62.8% $FeS_2$ and 21.0% $Bi_2O_3$ with the overall wet cathode mix being about 140 milligrams. The open circuit voltages of the cells were measured and then the average open circuit voltage of five cells in each cell lot was calculated and the minimum and maximum open circuit voltages were observed. These data are shown in Table 5. Five cells of each cell lot were stored for three weeks at ambient temperature and then were pulse discharged at −10° C. across a 2 K-ohm load. The voltage was observed at 8 milliseconds and at 2 seconds. The average CCV, average minimum CCV and average maximum CCV for five cells in each lot were calculated and are shown in Table 5. These data demonstrate the improvement that is obtainable in the voltage level on pulse discharge of cells employing the lithium chloride additive of this invention in the range recited above.

TABLE 5

| | | | | | | −10° C. CCV (after 3 weeks at ambient temp.) | | | | | |
|---|---|---|---|---|---|---|---|---|---|---|---|
| Cell | Cathode $FeS_2$ | | OCV | | | 8 msec. | | | 2 sec. | | |
| Lot | plus | Additive | Avg. | Min. | Max. | Avg. | Min. | Max. | Avg. | Min. | Max. |
| 1 | — | 0.2M LiCl | 1.76 | 1.75 | 1.77 | 1.38 | 1.32 | 1.42 | 1.39 | 1.35 | 1.41 |
| 2 | — | 0.1M LiCl | 1.80 | 1.79 | 1.81 | 1.27 | 1.20 | 1.32 | 1.38 | 1.37 | 1.40 |
| 3 | — | 0.04M LiCl | 1.81 | 1.80 | 1.81 | 0.82 | 0.59 | 1.02 | 1.02 | 0.70 | 1.22 |
| 4 | — | No LiCl (control) | 1.85 | 1.84 | 1.87 | 1.26 | 1.16 | 1.49 | 1.26 | 1.17 | 1.53 |
| 5 | $Bi_2O_3$ | 0.2M LiCl | 1.81 | 1.80 | 1.83 | 1.43 | 1.36 | 1.50 | 1.43 | 1.39 | 1.46 |
| 6 | $Bi_2O_3$ | 0.1M LiCl | 1.86 | 1.85 | 1.89 | 1.31 | 1.23 | 1.37 | 1.41 | 1.37 | 1.45 |
| 7 | $Bi_2O_3$ | 0.04M LiCl | 1.88 | 1.86 | 1.90 | 1.07 | 1.04 | 1.13 | 1.36 | 1.33 | 1.42 |
| 8 | $Bi_2O_3$ | No LiCl (control) | 2.02 | 1.98 | 2.17 | 1.28 | 1.16 | 1.41 | 1.23 | 1.17 | 1.30 |

I claim:

1. A nonaqueous cell comprising a lithium anode, a liquid orgaic electrolyte solution compound of a solvent and solute, and an active cathode selected from the group consisting of an iron sulfur-containing cathode and a $MnO_2$-containing cathode; the improvement wherein at least one lithium halide is added to the cell, said lithium halide being different from the solute used in the electrolyte solution.

2. The nonaqueous cell of claim 1 wherein the lithium halide is selected from the group consisting of LiCl, LiF, LiBr, LiI and mixtures thereof.

3. The nonaqueous cell of claim 1 wherein the lithium halide is LiCl.

4. The nonaqueous cell of claim 1, 2 or 3 wherein the lithium halide is dissolved in the electrolyte in an amount from about 0.05 molar up to its saturation in the electrolyte at 25° C.

5. The nonaqueous cell of claim 1, 2 or 3 wherein the lithium halide is deposited as a film on the surface of the anode.

6. The nonaqueous cell of claim 5 wherein a portion of the lithium halide is dissolved in the electrolyte.

7. The nonaqueous cell of claim 5 wherein a portion of the lithium halide is incorporated in cathode of the cell.

8. The nonaqueous cell of claim 1, 2 or 3 wherein the lithium halide is incorporated in the cathode of the cell.

9. The nonaqueous cell of claim 8 wherein a portion of the lithium halide is dissolved in the electrolyte.

10. The nonaqueous cell of claim 8 wherein a portion of the lithium halide is dissolved in the electrolyte and a portion of the lithium halide is deposited as a film on the anode.

11. The nonaqueous cell of claim 1, 2 or 3 wherein the cathode comprises $FeS_2$.

12. The nonaqueous cell of claim 1, 2 or 3 wherein the cathode comprises a mixture of $FeS_2$ and at least one active material selected from the group consisting of CuO, $Bi_2O_3$, $Pb_2Bi_2O_5$, $Pb_3O_4$, and $CoS_2$.

13. The nonaqueous cell of claim 1, 2 or 3 wherein a conductive agent and a binder are incorporated in the active cathode.

14. The nonaqueous cell of claim 1, 2 or 3 wherein the cathode comprises $MnO_2$.

* * * * *